3,211,787
PERFLUOROCHLOROSULFENYL CHLORIDES
Murray Hauptschein, Glenside, Pa., Milton Braid, Haddon Heights, N.J., and Francis E. Lawlor, Torrance, Calif., assignors to Pennsalt Chemicals Corporation, Philadelphia, Pa., a corporation of Pennsylvania
No Drawing. Original application Aug. 9, 1960, Ser. No. 48,361, now Patent No. 3,100,228, dated Aug. 6, 1963. Divided and this application Jan. 16, 1963, Ser. No. 251,749
3 Claims. (Cl. 260—543)

This application is a division of copending application Serial No. 48,361 filed August 9, 1960, now Patent No. 3,100,228, which is a continuation-in-part of copending application Serial No. 658,508, filed May 13, 1957, now abandoned.

This invention relates to certain new perfluorochloropolysulfides and to sulfenyl chlorides derived therefrom.

The compounds of the invention are oily materials or soft wax or grease-like materials characterized by low volatility and high chemical stability. Because of this combination of properties and of their lubricity, the compounds of the invention are useful as lubricants or as lubricant additives, such as in high pressure gear lubrication, and are also useful as cutting oils or cutting oil additives.

The perfluorochloropolysulfides of the invention are those of the general formula:

$$R_f\text{—}CF_2CFCl\text{—}S_x\text{—}CFClCF_2\text{—}R_f$$

where $R_f$ is a perfluorochloroalkyl radical preferably having from 1 to 10, most desirably from about 2 to 6 carbon atoms. A perfluorochloroalkyl radical as used herein means an alkyl radical which contains only the elements carbon, chlorine and fluorine. The symbol x refers to an integer having a value ranging from 2 to about 5. It will be understood that the invention includes compounds where the two $R_f$ radicals are the same or different. Preferably, the molar ratio of fluorine to chlorine in the perfluorochloroalkyl radical $R_f$ is at least 1:1.

The perfluorochloropolysulfides of the invention may be prepared by reacting perfluorochloroalkyl iodides of the general formula:

$$R_fCF_2CFClI$$

where $R_f$ is as defined above, with elemental sulfur. The reaction of the iodide and the sulfur results in the liberation of elemental iodine and the linking together of two perfluorochloroalkyl radicals between a chain of two or more sulfur atoms. The reaction to form a disulfide may be represented, for example as follows:

$$2R_fCF_2CFClI + 2S \rightarrow R_fCF_2CFCl\text{—}S\text{—}S\text{—}CFClCF_2R_f\text{—}I_2$$

The reaction between the iodide and the elemental sulfur may be carried out at temperatures between about 150° C. and 300° C. and preferably between about 160° C. and 200° C. Reaction pressure is not a critical factor, and the reaction may in general be conducted between atmospheric pressure and higher pressures, e.g., up to 10,000 p.s.i.g. and higher. Time of reaction is again not critical and may be from a matter of say 10 minutes to several days. The proportion of sulfur used will depend to some extent on the amount of sulfur it is desired to have in the final product. Generally a molar excess of sulfur is desirable and usually between about 2 and 20 moles of elemental sulfur (S) will be present per mole of iodide.

In carrying out the reaction any suitable technique may be employed. Conveniently, the ingredients are simply put into a suitable vessel, such as a stainless steel or Monel autoclave or a glass vessel, in an inert atmosphere, and heated to the required temperature with stirring. In certain cases, it may be desirable to use an inert solvent, such as a fluorochloroalkane, as the reaction medium. Alternatively, the reaction may be carried out by passing the reactants through a heated tube.

The perfluorochloroalkyl iodides starting materials for the reaction may be conveniently prepared, for example, by reacting a perfluoroalkyl, or a perfluorochloralkyl iodide with chlorotrifluoroethylene, $CF_2\text{=}CFCl$, under free radical conditions to produce low molecular weight iodide telomers in accordance with procedures that are well known per se. Suitable starting iodides which may be used to prepare the perfluorochloropolysulfides of the invention include, for example, $CF_2ClCFClCF_2CFClI$
$CF_2ClCFCl(CF_2CFCl)_2I$
$CF_3CCl_2CF_2CFClI$
$CF_3CCl_2(CF_2CFCl)_2I$
$CF_2ClCCl_2CF_2CFClI$
$CF_2ClCCl_2(CF_2CFCl)_2I$
$CFCl_2CF_2(CF_2CFCl)_2I$
$CF_3(CF_2CFCl)_4I$
$CF_2Cl(CF_2CFCl)_2I$
$CFCl_2(CF_2CFCl)_2I$
$C_2F_5(CF_2CFCl)_3I$
$CF_3(CF_2Cl)CFCF_2CFClI$
$C_3F_7CF_2CFClCF_2CFClI$ In another aspect of the invention, the novel perfluorochloroalkylpolysulfides of the invention may be converted into novel sulfenyl chlorides by reaction of the polysulfides with elemental chlorine to produce sulfenyl chlorides having the general formula:

$$R_fCF_2CFClSCl$$

where $R_f$ is as defined above.

The reaction of the perfluorochloroalkylpolysulfides with chlorine to produce the above sulfenyl chlorides is preferably conducted at temperatures between about 20° C. and 250° C. usually between 50° C. and about 150° C. Pressure is not critical and pressures ranging, e.g., from atmospheric, e.g., to 10,000 p.s.i.g. and higher may be used. Reaction time is likewise not critical and may range from say 10 minutes to several days. Chlorine is preferably use in molar excess, proportions ranging, e.g., from 1 to about 10 moles of chlorine (Cl₂) per mole of polysulfide.

Again, the partcular manipulation technique by means of which the chlorination of the polysulfide is carried out is not important. Conveniently, the polysulfiide is put into a pressure vessel with the required amount of chlorine and heated to reaction temperature. Alternatively, the reaction can be carried out by passing the chlorine and polysulfide through a hot tube.

Typical sulfenyl chlorides of the invention include, for example:

$CF_2ClCFClCF_2CFClSCl$
$CF_2ClCFCl(CF_2CFCl)_2SCl$
$CF_2ClCCl_2CF_2CFClSCl$
$CF_2ClCCl_2(CF_2CFCl)_2SCl$
$CF_3CCl_2CF_2CFClSCl$
$CF_3(CF_2CFCl)_4SCl$
$CF_3(CF_2Cl)CFCF_2CFClSCl$

The following examples are for the purpose of illustrating the invention.

*Example 1*

A heavy wall pyrex tube having a 100 milliliter capacity is charged with 1.92 g. (0.06 mole) of elemental sulfur and 12.36 g. (0.03 mole) of $CF_2ClCCl_2CF_2CFClI$ under an atmosphere of dry nitrogen. The tube is heated in an oil bath at 160° C. for 2 hours.

The reaction product, a viscous oil consisting of perfluorochloroalkylpolysulfides of the formula $$CF_2ClCCl_2CF_2CFCl-S_x-CFClCF_2CCl_2CF_2Cl$$

is separated from the liberated solid iodine and then distilled in a small Vigreaux distillation unit. Three fractions are collected:

(a) A fraction boiling at 166° to 167° C. at about 0.1 mm. Hg having a refractive index $n_D^{26}$ 1.4840, this being the disulfide.

$$CF_2ClCCl_2CF_2CFCl-S-S-CFClCF_2CCl_2CF_2Cl$$

*Analysis.*—Calculated for: C, 15.16; Cl, 44.75. Found: C, 15.00; Cl, 44.64.

(b) A fraction having a boiling point of 167° to 182° C. at about 0.1 mm. Hg, and a refractive index $n_D^{25}$ 1.4995, this being the trisulfide $$CF_2ClCCl_2CF_2CFCl-S-S-S-CFClCF_2CCl_2CF_2Cl$$

*Analysis.*—Calculated for: C, 14.4; Cl, 42.6; S, 14.4. Found: C, 14.2; Cl, 42.5; S, 14.0.

(c) A heavy oil consisting of polysulfides of the formula $$CF_2ClCCl_2CF_2CFCl-S_x-CFClCF_2CCl_2CF_2Cl$$

where $x$ is 4 to 5.

Fractions (a) and (b) are non-volatile oils having excellent lubricity useful particularly where extreme pressure lubricant characteristics are desired.

Example 2

A heavy wall pyrex tube is charged with 40 g. of the iodide $CF_2ClCFClCF_2CFClI$, and 12.8 g. (0.4 mole) of elemental sulfur. The tube is sealed under an atmosphere of nitrogen and then heated for 112 hours at 175° to 180° C. A viscous high boiling oil is obtained consisting of polysulfides of the formula $$CF_2ClCFClCF_2CFCl-S_x-CFClCF_2CFClCF_2Cl$$

where $x$ is mostly from 2 to 3.

Example 3

A heavy wall glass tube is charged with 51 g. (0.1 mole) of the iodide $CF_2ClCFCl(CF_2CFCl)_2I$ and 12.8 g. (0.4 mole) of elemental sulfur. The tube is sealed under an atmosphere of dry nitrogen and then heated for 112 hours at 175° to 180° C. The product, a viscous oil, is removed from the tube, dissolved in methylene chloride and washed with sodium thiosulfate. After drying and solvent removal there is obtained 26 g. of a viscous high boiling oil comprising perfluorochloropolysulfides of the formula:

$$CF_2ClCFCl(CF_2CFCl)_2-S_x-(CFClCF_2)_2CFClCF_2Cl$$

where $x$ is mostly from 2 to 3, and a residue of soft solids where $x$ is 4 to 5.

Example 4

The iodide $CF_3(CF_2CFCl)_3I$ is reacted with elemental sulfur following the procedures of the previous examples. There is obtained a viscous high boiling oil consisting of perfluorochloropolysulfides of the formula $$CF_3(CF_2CFCl)_3-S_x-(CFClCF_2)_3CF_3$$

where $x$ is mostly from 2 to 3.

Example 5

The perfluorochloropolysulfide prepared in accordance with Example 1 having the formula:

$$CF_2ClCCl_2CF_2CFCl-S-S-CFClCF_2CCl_2CF_2Cl$$

is chlorinated for one hour at 150° C. and then for one-half hour at 200° C. by bubbling anhydrous chlorine through the polysulfide in a glass tube. The chlorinated product is distilled in a small Vigreaux distillation unit at 20 mm. Hg. There is recovered a fraction boiling at 110° to 115° C. at 20 mm. Hg, this being the perfluorochlorosulfenyl chloride of the formula:

$$CF_2ClCCl_2CF_2CFClSCl$$

In a similar manner, the perfluorochloropolysulfide prepared in accordance with Example 1 of the formula $$CF_2ClCCl_2CF_2CFCl-S-S-S-CFClCF_2CCl_2CF_2Cl$$

is chlorinated to produce a sulfenyl chloride of the same formula given above.

Example 6

The perfluorochloropolysulfide prepared in accordance with Example 2 of the formula $$CF_2ClCFClCF_2CFCl-S_x-CFClCF_2CFClCF_2Cl$$

where $x$ is mostly 2 to 3 is chlorinated at a temperature of from 150° to 200° C. by passing elemental chlorine through the polysulfide for 2 hours. A sulfenyl chloride having the formula $CF_2ClCFClCF_2CFClSCl$ is obtained in good yield.

Example 7

A polysulfide prepared in accordance with Example 3 of the formula $$CF_2ClCFCl(CF_2CFCl)_2-S_x-(CFClCF_2)_2CFClCF_2Cl$$

where $x$ is most 2 to 3 is chlorinated according to the procedures of the previous examples and a sulfenyl chloride of the formula $CF_2ClCFCl(CF_2CFCl)_2SCl$ is obtained.

Example 8

A perfluorochloropolysulfide prepared in accordance with Example 4 of the formula $$CF_3(CF_2CFCl)_3-S_x-(CFClCF_2)_3CF_3$$

is chlorinated in accordance with the procedures of the previous examples. There is obtained a perfluorochlorosulfenyl chloride of the formula $CF_3(CF_2CFCl)_3SCl$.

The perfluorochloropolysulfides and sulfenyl chlorides of the invention are high boiling oily materials or waxy materials of relatively low melting point. These materials are useful as synthetic lubricants either in themselves or as anti-wear or extreme pressure additives for lubricants which are used, for example, in the lubrication of hypoid gears. The sulfenyl chlorides also have utility as fungicides.

It is to be understood that other variations and embodiments are included within the scope of the invention in addition to those specifically described above; the embodiments described are for the purpose of illustrating and exemplifying the invention and the invention is not limited thereto.

We claim:

1. Perfluorochlorosulfenyl chlorides of the formula:

$$R_fCF_2CFClSCl$$

where $R_f$ is a prefluorochloroalkyl radical.

2. Perfluorochlorosulfenyl chlorides in accordance with claim 1 in which said perfluorochloroalkyl radical contains from 2 to 6 carbon atoms.

3. Perfluorochlorosulfenyl chloride of the formula:

$$CF_2ClCCl_2CF_2CFClSCl$$

References Cited by the Examiner

UNITED STATES PATENTS 3,019,258  1/62  Hauptschein et al. _____ 260—543

LORRAINE A. WEINBERGER, *Primary Examiner.*

LEON ZITVER, *Examiner.*

UNITED STATES PATENT OFFICE
CERTIFICATE OF CORRECTION

Patent No. 3,211,787

October 12, 1965

Murray Hauptschein et al.

It is hereby certified that error appears in the above numbered patent requiring correction and that the said Letters Patent should read as corrected below.

Column 1, line 53, for "$-CFClCF_2R_f-I_2$" read -- $-CFClCF_2R_f+I_2$ --; column 2, line 44, for "use" read -- used --; line 47, for "partcular" read -- particular --; column 4, line 60, for "prefluorochloroalkyl" read -- perfluorochloroalkyl --.

Signed and sealed this 3rd day of May 1966.

(SEAL)
Attest:

ERNEST W. SWIDER
Attesting Officer

EDWARD J. BRENNER
Commissioner of Patents